United States Patent
Mutangana et al.

(10) Patent No.: US 12,372,948 B2
(45) Date of Patent: Jul. 29, 2025

(54) CONTROLLING OPERATIONAL CHARACTERISTICS OF A PLURALITY OF WIRELESS ACCESS POINTS OF A MANUFACTURING ENVIRONMENT

(71) Applicant: Ford Global Technologies, LLC, Dearborn, MI (US)

(72) Inventors: Jean de Dieu Mutangana, Detroit, MI (US); Mohsen Bahrami, Birmingham, MI (US); Hamed Asadi, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 17/711,327

(22) Filed: Apr. 1, 2022

(65) Prior Publication Data
US 2023/0315063 A1    Oct. 5, 2023

(51) Int. Cl.
  *G05B 19/418*    (2006.01)
  *H04W 74/00*    (2009.01)
(52) U.S. Cl.
  CPC ..... *G05B 19/4185* (2013.01); *G05B 19/4188* (2013.01); *H04W 74/002* (2013.01)
(58) Field of Classification Search
  CPC ... H04L 41/0886; H04L 41/145; H04L 43/08; H04L 43/0888; H04W 24/02; H04W 24/04; H04W 28/086; H04W 74/002; G05B 19/4185; G05B 19/4188
  See application file for complete search history.

(56) References Cited

U.S. PATENT DOCUMENTS

| | | | |
|---|---|---|---|
| 7,496,070 B2 | 2/2009 | Vesuna | |
| 9,066,251 B2* | 6/2015 | Madan | H04W 48/20 |
| 9,113,352 B2 | 8/2015 | Agarwal et al. | |
| 9,503,933 B2* | 11/2016 | Yang | H04W 84/12 |
| 9,736,703 B2 | 8/2017 | Goldsmith et al. | |
| 10,015,681 B2 | 7/2018 | Agarwal et al. | |
| 10,225,772 B2* | 3/2019 | Gemelos | H04W 36/008357 |
| 10,869,203 B2* | 12/2020 | Gallegos | H04W 16/20 |
| 11,140,561 B2* | 10/2021 | Zhao | H04L 45/02 |
| 11,576,055 B2* | 2/2023 | Perenda | H04L 43/0852 |
| 11,601,826 B2* | 3/2023 | Kerpez | H04W 72/542 |
| 2009/0296604 A1* | 12/2009 | Karaoguz | H04W 24/02 370/254 |
| 2014/0036788 A1* | 2/2014 | Ganu | H04W 52/367 370/329 |

(Continued)

FOREIGN PATENT DOCUMENTS

WO    WO-2022199792 A1 *    9/2022

*Primary Examiner* — Vincent H Tran
(74) *Attorney, Agent, or Firm* — Burris Law, PLLC

(57) ABSTRACT

A method for controlling one or more operational characteristics of a plurality of wireless access points of a manufacturing environment includes generating a plurality of state vectors based on network data associated with the plurality of wireless access points and identifying a set of actions from among a plurality of actions and associated with the plurality of state vectors. The method includes determining a reward for each action from among the set of actions, selecting a target action from among the set of actions based on the reward associated with each action from among the set of actions, and selectively adjusting the one or more operational characteristics of the plurality of wireless access points based on the target action.

20 Claims, 7 Drawing Sheets

(56) References Cited

U.S. PATENT DOCUMENTS

Figure 1:
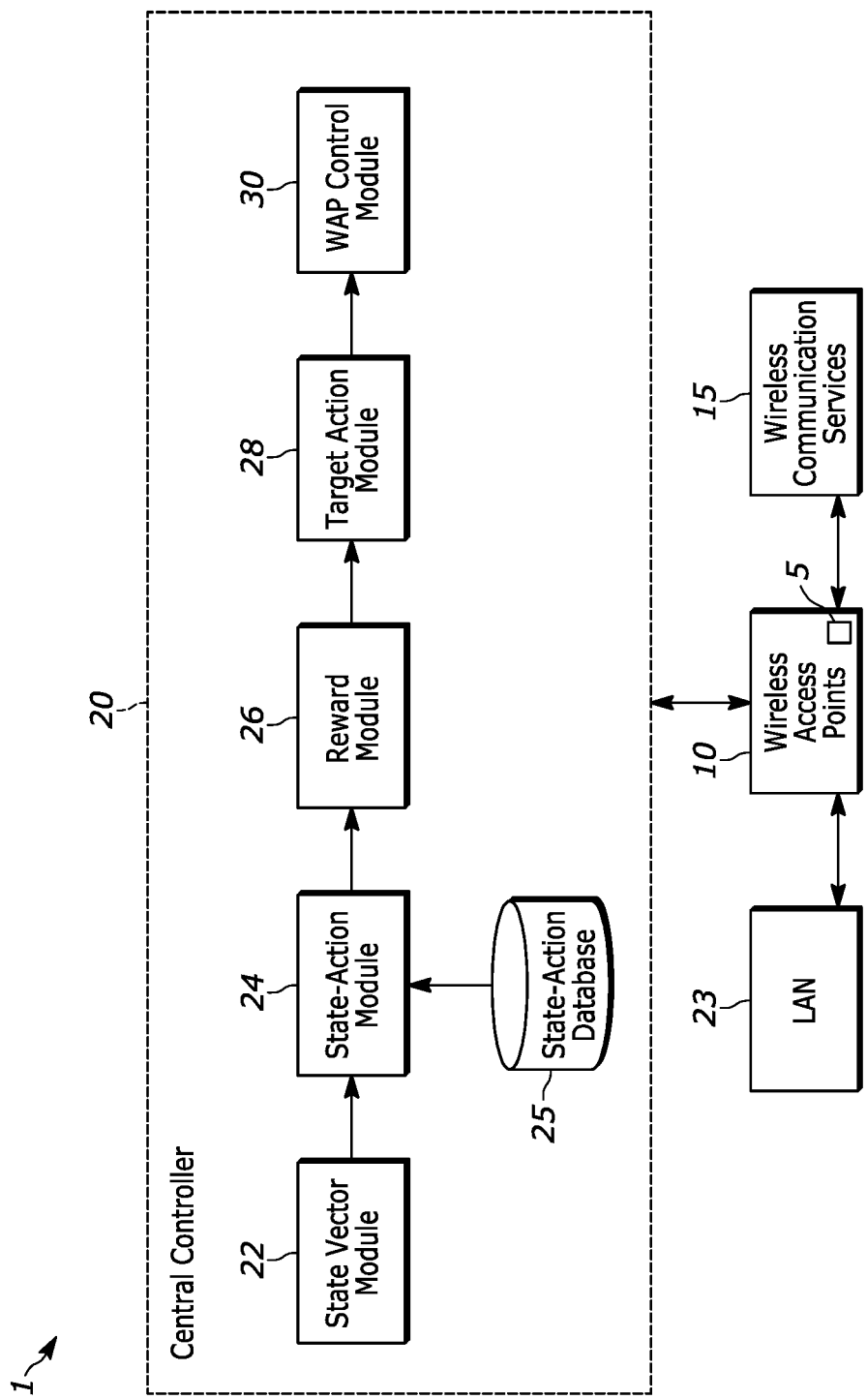

| | | | |
|---|---|---|---|
| 2015/0365833 A1* | 12/2015 | Stafford | H04W 24/02 |
| | | | 370/252 |
| 2019/0014488 A1* | 1/2019 | Tan | G06N 3/044 |
| 2020/0359297 A1* | 11/2020 | Xu | H04W 40/246 |
| 2021/0368362 A1* | 11/2021 | Rengarajan | H04W 24/02 |
| 2022/0150727 A1* | 5/2022 | Pezeshki | H04L 41/145 |

* cited by examiner

CONTROLLING OPERATIONAL CHARACTERISTICS OF A PLURALITY OF WIRELESS ACCESS POINTS OF A MANUFACTURING ENVIRONMENT

FIELD

The present disclosure relates to systems and methods for controlling one or more operational characteristics of a plurality of wireless access points of a manufacturing environment.

BACKGROUND

The statements in this section merely provide background information related to the present disclosure and may not constitute prior art.

In a manufacturing environment, wireless communication devices are utilized in various manufacturing processes. As an example, wireless communication devices may broadcast or receive various types of data to/from a remote computing system, a static/autonomous robot, a machining cell, and/or other wireless communication devices via one or more wireless access points and defined communication channels of a radio frequency (RF) spectrum. However, wireless access points may be inaccessible due to local power outages, equipment malfunction, noise pollution, and/or network congestion, thereby inhibiting, the transmission or reception of RF signals in the manufacturing environment. These issues with wireless access point inaccessibility, among other issues, are addressed by the present disclosure.

SUMMARY

This section provides a general summary of the disclosure and is not a comprehensive disclosure of its full scope or all of its features.

The present disclosure provides a method for controlling one or more operational characteristics of a plurality of wireless access points of a manufacturing environment includes generating a plurality of state vectors based on network data associated with the plurality of wireless access points and identifying a set of actions from among a plurality of actions and associated with the plurality of state vectors. The method includes determining a reward for each action from among the set of actions, selecting a target action from among the set of actions based on the reward associated with each action from among the set of actions, and selectively adjusting the one or more operational characteristics of the plurality of wireless access points based on the target action.

In one form, the set of actions are identified based on a Markov decision process (MDP) model associated with the plurality of wireless access points. In one form, the plurality of actions includes a self-organizing action, a radio frequency (RF) adjustment action, and a state-remain action. In one form, when the target action corresponds to a self-organizing action, selectively adjusting the one or more operational characteristics of the plurality of wireless access points further comprises performing one of a self-configuration routine and a self-healing routine. In one form, selectively adjusting the one or more operational characteristics of the plurality of wireless access points further comprises performing a load balancing routine. In one form, when the target action corresponds to a radio frequency (RF) adjustment action, selectively adjusting the one or more operational characteristics of the plurality of wireless access points further comprises adjusting one or more RF characteristics, as the one or more operational characteristics, of the wireless access points.

In one form, the reward is a value that is indicative of a qualitative metric associated with the network data, a quantitative metric associated with the network data, or a combination thereof. In one form, the reward is further based on a location control weight associated with each action from among the set of actions. In one form, each state vector from among the plurality of state vectors corresponds to a given wireless access point from among the plurality of wireless access points and a given set of network data from among the network data, each state vector from among the plurality of state vectors defines a location of the given wireless access point, and each state vector from among the plurality of state vectors defines a discrete time value associated with the given set of network data. In one form, the network data is indicative of a signal power of the plurality of wireless access points, a transmission frequency of the plurality of wireless access points, a throughput rate of the plurality of wireless access points, or a combination thereof.

The present disclosure provides a system for controlling one or more operational characteristics of a plurality of wireless access points of a manufacturing environment including one or more processors and one or more nontransitory computer-readable mediums storing instructions that are executable by the one or more processors. The instructions include generating a plurality of state vectors based on network data associated with the plurality of wireless access points, where the network data is indicative of a signal power of the plurality of wireless access points, a transmission frequency of the plurality of wireless access points, a throughput rate of the plurality of wireless access points, or a combination thereof. The instructions include identifying a set of actions from among a plurality of actions and associated with the plurality of state vectors based on a Markov decision process (MDP) model associated with the plurality of wireless access points, where the plurality of actions include a self-organizing action, a radio frequency (RF) adjustment action, and a state-remain action. The instructions include determining a reward for each action from among the set of actions, where the reward is a value that is indicative of a qualitative metric associated with the network data, a quantitative metric associated with the network data, or a combination thereof. The instructions include selecting a target action from among the set of actions based on the reward associated with each action from among the set of actions and selectively adjusting the one or more operational characteristics of the plurality of wireless access points based on the target action.

In one form, when the target action corresponds to a self-organizing action, selectively adjusting the one or more operational characteristics of the plurality of wireless access points further comprises performing one of a self-configuration routine and a self-healing routine. In one form, selectively adjusting the one or more operational characteristics of the plurality of wireless access points further comprises performing a load balancing routine. In one form, when the target action corresponds to a radio frequency (RF) adjustment action, selectively adjusting the one or more operational characteristics of the plurality of wireless access points further comprises adjusting one or more RF characteristics, as the one or more operational characteristics, of the wireless access points. In one form, the reward is further based on a location control weight associated with each action from among the set of actions. one form, each state vector from among the plurality of state vectors corresponds to a given wireless access point from among the plurality of wireless access points and a given set of network data from among the network data, each state vector from among the plurality of state vectors defines a location of the given wireless access point, and each state vector from among the plurality of state vectors defines a discrete time value associated with the given set of network data. In one form, the network data is indicative of a signal power of the plurality of wireless access points, a transmission frequency of the plurality of wireless access points, a throughput rate of the plurality of wireless access points, or a combination thereof.

The present disclosure provides a method for controlling one or more operational characteristics of a plurality of wireless access points of a manufacturing environment including generating a plurality of state vectors based on network data associated with the plurality of wireless access points, where the network data is indicative of a signal power of the plurality of wireless access points, a transmission frequency of the plurality of wireless access points, a throughput rate of the plurality of wireless access points, or a combination thereof. The method includes identifying a set of actions from among a plurality of actions and associated with the plurality of state vectors based on a Markov decision process (MDP) model associated with the plurality of wireless access points, where the plurality of actions include a self-organizing action, a radio frequency (RF) adjustment action, and a state-remain action. The method includes determining a reward for each action from among the set of actions and a location control weight associated with each action from among the set of actions, selecting a target action from among the set of actions based on the reward associated with each action from among the set of actions, and selectively adjusting the one or more operational characteristics of the plurality of wireless access points based on the target action.

Further areas of applicability will become apparent from the description provided herein. It should be understood that the description and specific examples are intended for purposes of illustration only and are not intended to limit the scope of the present disclosure.

DRAWINGS

Figure 2:
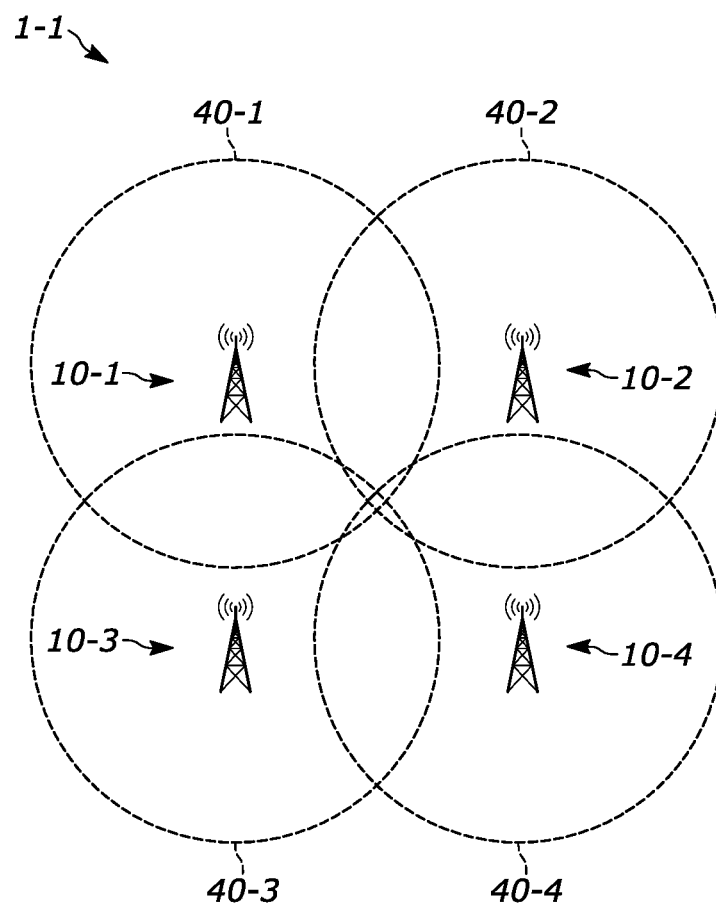
Figure 3:
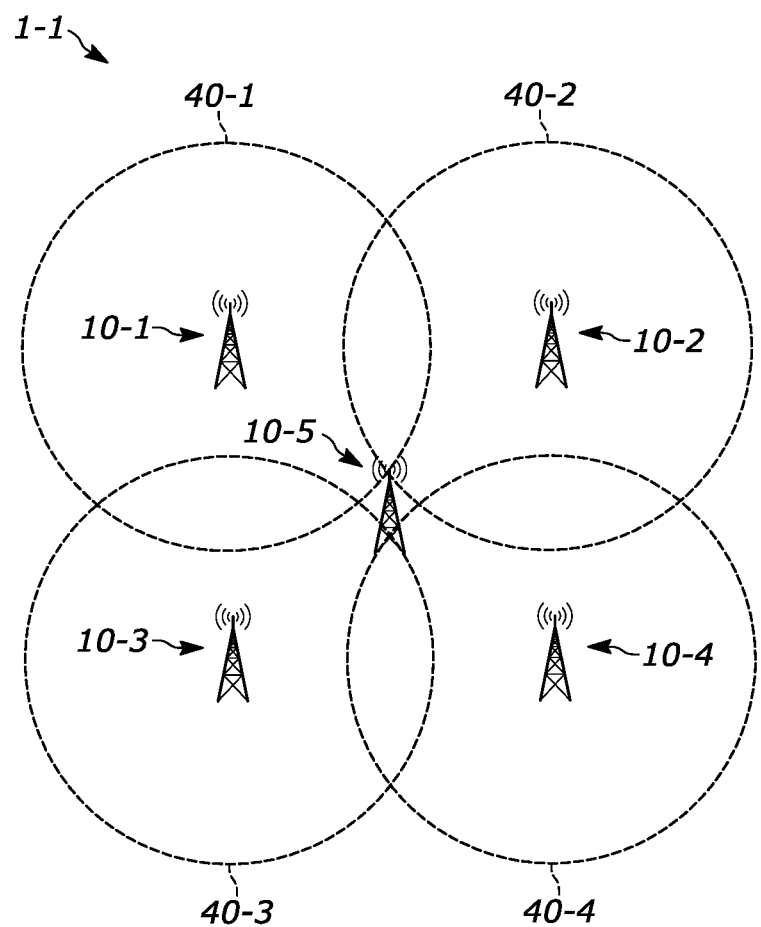
Figure 4:
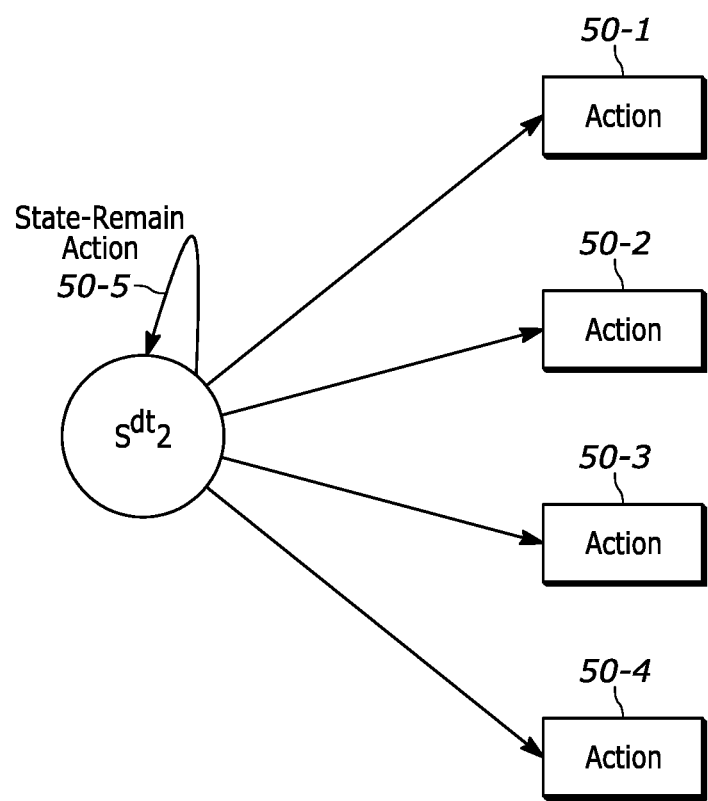
Figure 5:
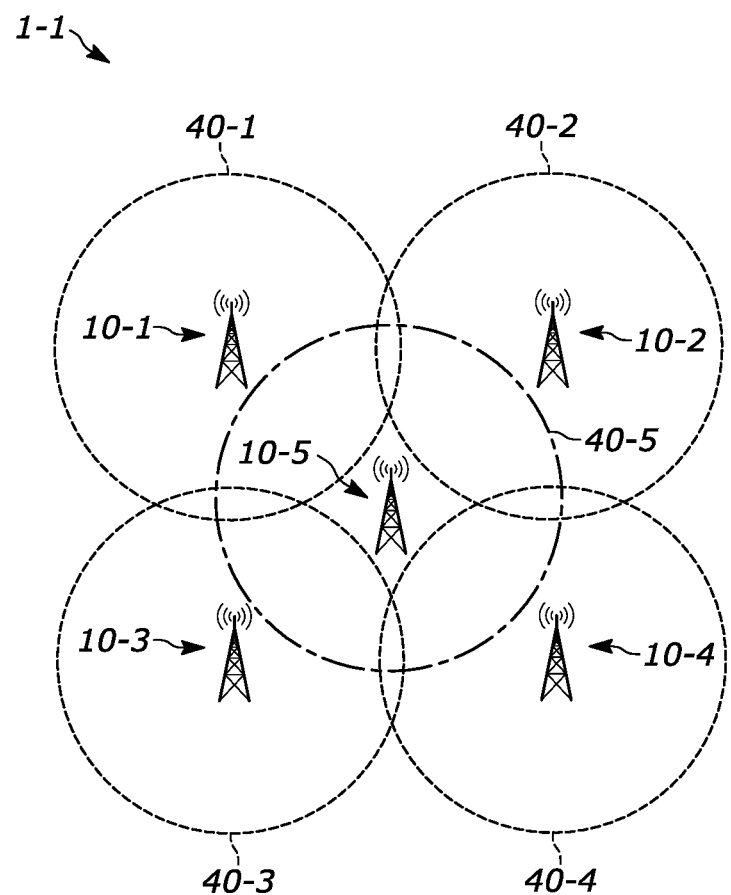
Figure 6:
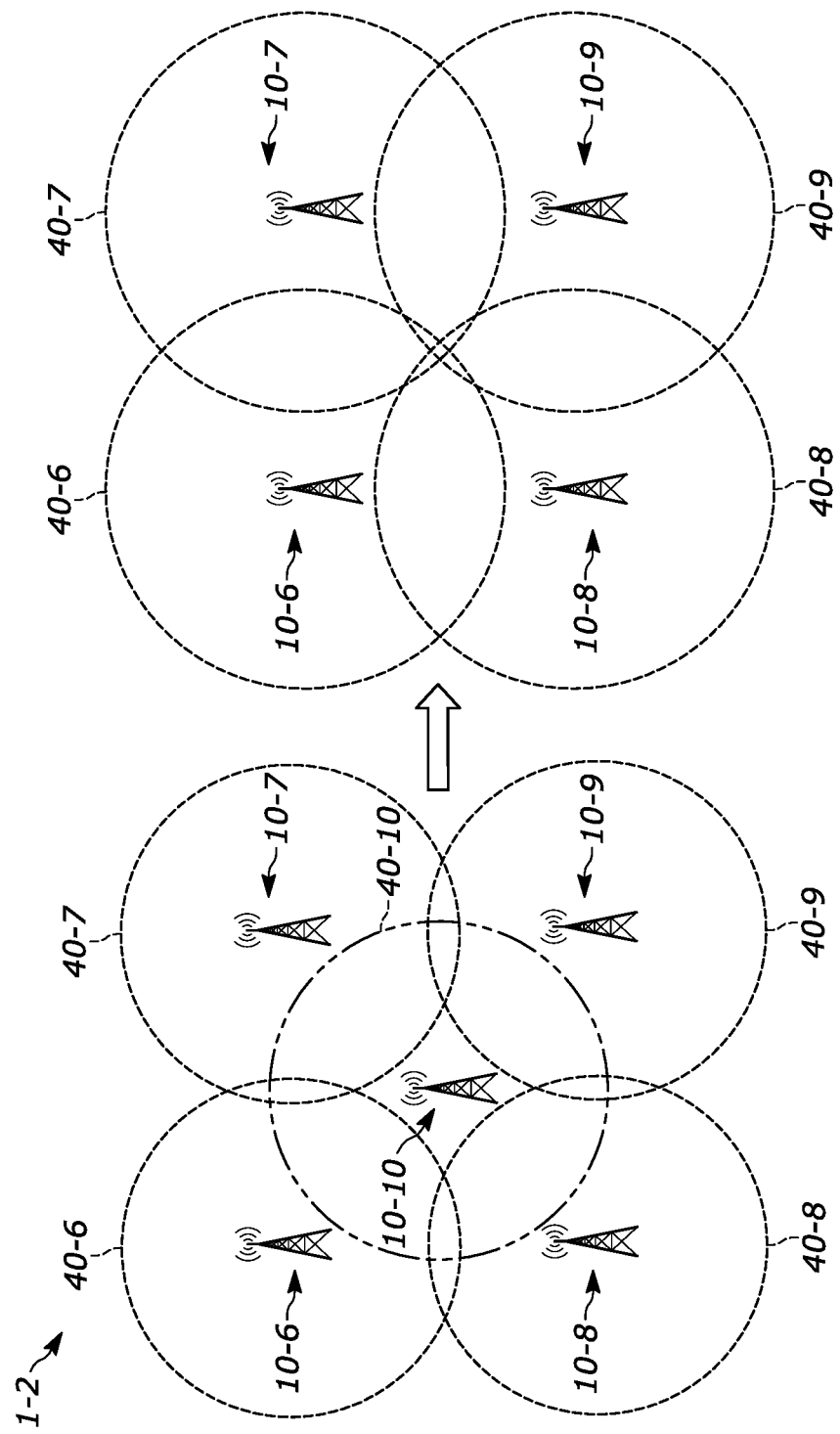
Figure 7:
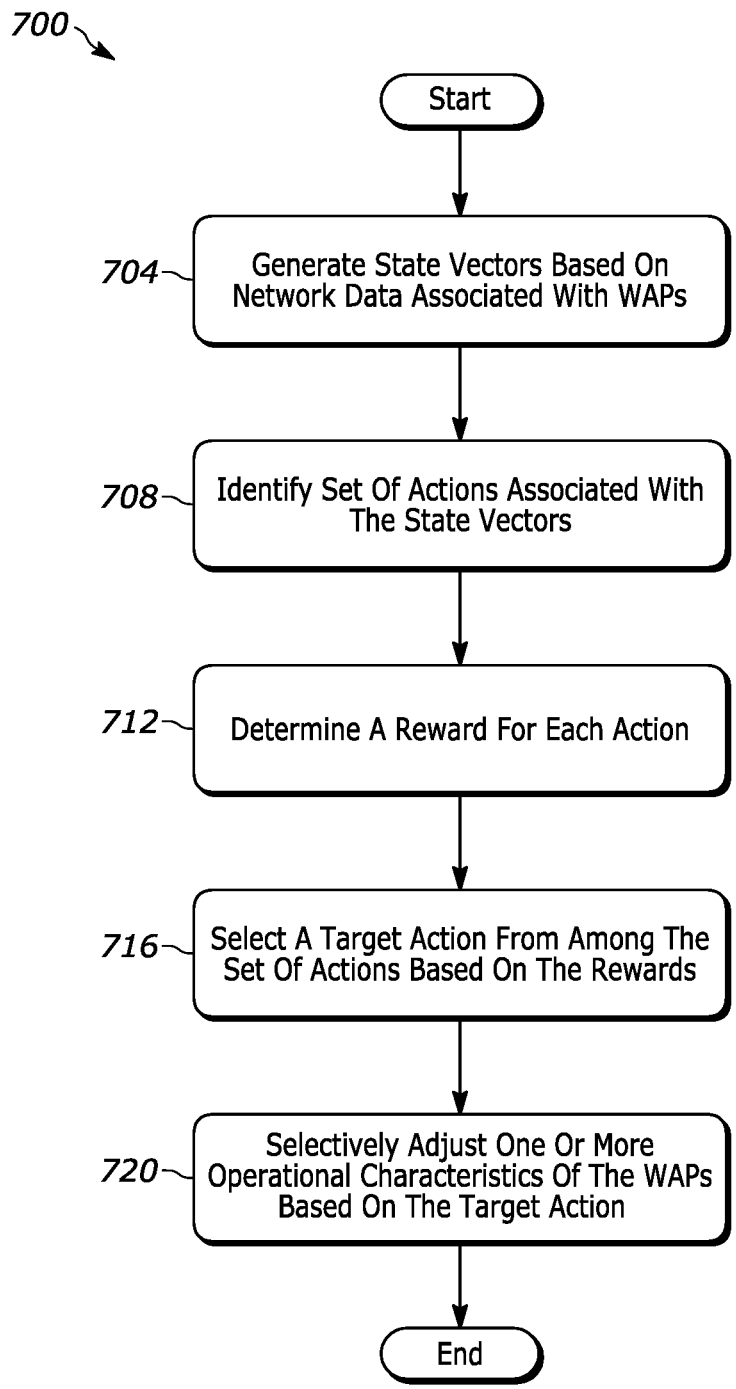

In order that the disclosure may be well understood, there will now be described various forms thereof, given by way of example, reference being made to the accompanying drawings, in which:

FIG. 1 illustrates a functional block diagram of a manufacturing environment in accordance with the teachings of the present disclosure;

FIG. 2 schematically illustrates network data associated with a plurality of wireless access points at a first discrete time value in accordance with the teachings of the present disclosure;

FIG. 3 schematically illustrates network data associated with a plurality of wireless access points at a second discrete time value in accordance with the teachings of the present disclosure;

FIG. 4 schematically illustrates a plurality of actions associated with a state vector that is based on the network data at the second discrete time value of FIG. 3 in accordance with the teachings of the present disclosure;

FIG. 5 schematically illustrates network data associated with a plurality of wireless access points in response to controlling the plurality of wireless access point based on a selected target action in accordance with the teachings of the present disclosure;

FIG. 6 schematically illustrates network data associated with a plurality of wireless access points in response to controlling the plurality of wireless access point based on another selected target action in accordance with the teachings of the present disclosure; and FIG. 7 is a flowchart of an example control routine in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for controlling one or more operational characteristics of a plurality of wireless access points of a manufacturing environment. A central controller generates a plurality of state vectors based on network data associated with the plurality of wireless access points and performs a reinforcement learning routine to selectively adjust the operational characteristics of the wireless access points. Specifically, the central controller identifies a set of actions associated with the plurality of state vectors, determines a reward for each action from among the set of actions, selects a target action from among the set of actions based on the rewards, and controls the operational characteristics of the plurality of wireless access points based on the target action. Accordingly, the reinforcement learning routine enables the central controller to provide uninterrupted wireless network access when the central controller detects dynamic changes of the manufacturing environment, such as the addition/deletion of wireless access points, unexpected downtimes associated with the wireless access points, among other dynamic changes of the manufacturing environment. Furthermore, the reinforcement learning routine enables the central controller to enhance network connectivity and throughput while inhibiting signal interference.

Referring to FIG. 1, a manufacturing environment 1 for manufacturing a component (e.g., a vehicle, engine, climate control system, etc.) is shown. The manufacturing environment 1 generally includes radio frequency (RF) sensors 5, wireless access points 10, wireless communication devices 15, a central controller 20, and a local area network (LAN) 23. While the central controller 20 is illustrated as part of the manufacturing environment 1, it should be understood that the central controller 20 may be positioned remotely from the manufacturing environment 1. While the RF sensors 5 are shown as part of the wireless access points 10, it should be understood that the RF sensors 5 may be positioned remotely from the wireless access points 10. In one form, the RF sensors 5, the wireless access points 10, the wireless communication devices 15, and the central controller 20 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the RF sensors 5 are configured to provide network data associated with the wireless access points 10 to the central controller 20. In one form, the network data is indicative of a signal power, transmission frequency, and/or throughput rate associated with the wireless access points 10. Accordingly, the RF sensors 5 may include diode detector-based RF sensors, thermistor RF power sensors, thermocouple RF power sensors, among other sensors configured to detect various metrics indicative of the network data, such as a power ratio in decibels of the message (dBm), a power spectral density of the message (dBm/MHz), a packet error rate (PER), a signal-to-noise ratio (SNR), a packet loss and error rate, latency, among other metrics indicative of the network data.

In one form, the wireless access points 10 are networking devices that enable the wireless communication devices 15 to establish a communication link with the LAN 23 using the wireless communication protocols described above. The wireless access points 10 include, but are not limited to, a Wi-Fi-type router, a Wi-Fi-type signal booster/extender, among others. Furthermore, in some forms, the wireless access points 10 are configured to provide channel information to the central controller 20, where the channel information indicates the communication channels and/or transmission frequencies of a given wireless communication protocol that are being utilized by the wireless communication devices 15 at a given time.

In one form, RF sensors 5 and the wireless access points 10 are disposed at various fixed infrastructure elements of the manufacturing environment 1 including, but not limited to: an overhead beam, a tower, a light pole, a building, a sign, a machining device, a stationary storage rack/shelving system, among other fixed elements of the manufacturing environment 1. It should be understood that the RF sensors 5 and/or the wireless access points 10 may be disposed at various moveable elements of the manufacturing environment 1 in other forms.

In one form, the wireless communication devices 15 are computing devices that utilize a wireless communication protocol to perform and/or assist a manufacturing operation. The computing devices may include, but are not limited to: a computer, laptop, smartphone, tablet, personal digital assistant (PDA), special purpose controllers for specific manufacturing operations, among others. As an example, the wireless communication devices 15 are computing devices disposed at autonomous devices that are configured to autonomously move to various locations of the manufacturing environment 1, such as, but not limited to: mobile robots, mobile workstations, drones, and/or automated guided vehicles, among other autonomous devices. As another example, the wireless communication devices 15 are computing devices disposed on a machining apparatus, such as a computer numerically controlled (CNC) machine. It should be understood that the wireless communication devices 15 may be other suitable devices performing various other operations and are not limited to the examples described herein.

In one form, the central controller 20 includes a state vector module 22, a state-action module 24, a state-action database 25, a reward module 26, a target action module 28, and a wireless access point (WAP) control module 30. It should be readily understood that any one of the components of the central controller 20 can be provided at the same location or distributed at different locations (e.g., via one or more edge computing devices) and communicably coupled accordingly.

In one form, the state vector module 22 obtains network data from the plurality of RF sensors 5 and/or the wireless access points 10 and generates a plurality of state vectors based on the network data. In one form, each state vector corresponds to a given wireless access point 10, a location of the given wireless access point 10 within the manufacturing environment 1, a set of network data associated with the wireless access point 10, and a discrete time value associated with the set of network data. As an example, the state vectors (S) may be represented based on the following relation:

$$S^{d,t} = (S_1^{d,t}, S_2^{d,t}, \ldots, S_n^{d,t}) \quad (1)$$

In relation (1), n corresponds to the length of the state vector, where each element corresponds to a type and value of network data obtained by the central controller 20. In relation (1), d corresponds to the location and/or identification of the given wireless access point 10, and t is the discrete time value associated with the set of network data.

As a specific example and referring to FIG. 2, the state vector module 22 may generate a first state vector for wireless access points 10-1, 10-2, 10-3, 10-4 of manufacturing environment 1-1, where the wireless access points 10-1, 10-2, 10-3, 10-4 have signal powers represented by circles 40-1, 40-2, 40-3, 40-4, respectively, for discrete time value $t_1$, as shown below in table (1). In table (1), the element of the state vector representing the signal power is denoted by X, the element of the state vector representing the transmission frequency/channel is denoted by CH, and the element of the state vector representing the throughput rate is denoted by TR.

TABLE 1

State Vector Elements of First State Vector Associated with Wireless Access Points 10-1, 10-2, 10-3, 10-4 at Discrete Time Value $t_1$

| $S^{d,t1}$ | Signal Power | Transmission Frequency/Channel | Throughput Rate |
|---|---|---|---|
| $S^{d10\text{-}1,t1}$ | $X_1$ | $CH_1$ | $TR_1$ |
| $S^{d10\text{-}2,t1}$ | $X_1$ | $CH_1$ | $TR_1$ |
| $S^{d10\text{-}3,t1}$ | $X_1$ | $CH_1$ | $TR_2$ |
| $S^{d10\text{-}4,t1}$ | $X_1$ | $CH_1$ | $TR_2$ |

As another specific example and referring to FIG. 3, the state vector module 22 may generate a second state vector for the wireless access points 10-1, 10-2, 10-3, 10-4 and a newly added wireless access point 10-5 for a discrete time value $t_2$, as shown below in table (2).

TABLE 2

State Vector Elements of Second State Vector Associated with Wireless Access Points 10-1, 10-2, 10-3, 10-4, 10-5 at Discrete Time Value $t_2$

| $S^{d,t2}$ | Signal Power | Transmission Frequency/Channel | Throughput Rate |
|---|---|---|---|
| $S^{d10\text{-}1,t2}$ | $X_1$ | $CH_1$ | $TR_1$ |
| $S^{d10\text{-}2,t2}$ | $X_1$ | $CH_1$ | $TR_1$ |
| $S^{d10\text{-}3,t2}$ | $X_1$ | $CH_1$ | $TR_2$ |
| $S^{d10\text{-}4,t2}$ | $X_1$ | $CH_1$ | $TR_2$ |
| $S^{d10\text{-}5,t2}$ | 0 | $CH_1$ | 0 |

In one form and referring to FIGS. 1-3, the state-action module 24 identifies a set of actions from among a plurality of actions stored in the state-action database 25 associated with the state vectors. The plurality of action types may include, but is not limited to: a self-configuration action, a self-healing action, an RF adjustment action, a state-remain action, or a combination thereof. The self-configuration action and the self-healing action are collectively referred to hereinafter as a "self-organizing action."

As used herein, "self-configuration action" refers to the central controller 20 instructing the wireless access points 10 to adjust one or more operational characteristics of the wireless access points 10 to accommodate the inclusion of an additional wireless access point 10 to the plurality of wireless access points 10. As an example, the self-configuration action may refer to the central controller 20 instructing the wireless access points 10 to reduce the signal power of broadcasted signals and/or to change the transmission frequency/channel.

As used herein, "self-healing action" refers to the central controller 20 instructing the wireless access points 10 to adjust one or more operational characteristics of the wireless access points 10 to accommodate the removal of a wireless access point 10 from among the plurality of wireless access points 10 due to, for example, a local power outage, equipment malfunction, noise pollution, and/or network congestion associated with the given wireless access point 10. As an example, the self-configuration action may refer to the central controller 20 instructing the wireless access points 10 to increase the signal power of broadcasted signals and/or to change the transmission frequency/channel.

As used herein, "RF adjustment action" refers to the central controller 20 adjusting one or more operational characteristics of the wireless access points 10 to satisfy one or more network data constraints. Example network data constraints include, but are not limited to: a signal power constraint, a throughput rate constraint, a load balancing restraint, among others. As used herein, "state-remain action" refers to the central controller 20 maintaining the operational characteristics of the wireless access points 10.

In one form, an action is stored in the state-action database 25 for various operational characteristics of each action type. As an example, the state-action database 25 includes a plurality of self-configuration actions that correspond to various combinations of signal power reduction values and transmission frequencies/channels and a plurality of self-healing actions that correspond to various combinations of signal power increase values and transmission frequencies/channels. Likewise, the state-action database 25 includes a plurality of RF adjustment actions that correspond to various combinations of signal power value adjustments and transmission frequency/channel adjustments.

In one form, the state-action module 24 identifies the set of actions based on the values of the state vector and one or more action identification rules. As an example, the one or more action identification rules may correspond to the identification of only the RF adjustment actions and the state-remain action when the elements of the state vector do not correspond to the addition or removal of one of the wireless access points 10. As another example, the one or more action identification rules may correspond to the identification of only the RF adjustment actions, the self-configuration actions, and the state-remain action when the elements of the state vector correspond to the addition of a wireless access point 10. As an additional example, the one or more action identification rules may correspond to the identification of only the RF adjustment actions, the self-healing actions, and the state-remain action when the elements of the state vector correspond to the removal of a wireless access point 10. In one form, the state-action module 24 identifies the set of actions based on a Markov decision process (MDP) model associated with the wireless access points 10. That is, the state-action module 24 identifies the set of actions such that it is independent of all previously generated state vectors (i.e., state vectors having a discrete time value that precedes the current state vector).

As an example and referring to FIG. 4, the state-action module 24 identifies a set of actions 50-1, 50-2, 50-3, 50-4, 50-5 (collectively referred to hereinafter as "set of actions 50") from among a plurality of actions stored in the state-action database 25 based on the values of the second state vector (i.e., $S^{d, t_2}$, which is the state vector corresponding to discrete time value $t_2$ and the addition of the wireless access point 10-5 shown in FIG. 3), the one or more action identification rules, and the MDP model.

In one form, the action 50-1 defines a self-configuration action (i.e., the addition of the wireless access point 10-5) and a first RF adjustment action (e.g., setting the transmission signal powers of the wireless access points 10-1, 10-2, 10-3, 10-4, 10-5 to a first value and utilizing a first transmission channel). In one form, the action 50-2 defines a self-configuration action and a second RF adjustment action (e.g., setting the transmission signal powers of the wireless access points 10-1, 10-2, 10-3, 10-4, 10-5 to a second value and utilizing the first transmission channel). In one form, the action 50-3 defines a self-configuration action and a third RF adjustment action (e.g., setting the transmission signal powers of the wireless access points 10-1, 10-2, 10-3 to a first value, the transmission signal powers of the wireless access points 10-4, 10-5 to the second value, and utilizing the first transmission channel). In one form, the action 50-4 defines a self-configuration action and a fourth RF adjustment action (e.g., setting the transmission signal powers of the wireless access points 10-1, 10-2, 10-3, 10-4, 10-5 to the second value and utilizing a second transmission channel). In one form, the action 50-5 is the state-remain action (i.e., refrain from adjusting the operational characteristics of the wireless access points 10-1, 10-2, 10-3, 10-4, 10-5). While five actions are shown in FIG. 4, it should be understood that the state-action module 24 may identify any number of actions in other forms.

In one form, the reward module 26 is configured to determine a reward for each action from among the set of actions 50 using known reinforcement learning routines (e.g., Q-learning routines having a learning rate equal to 0). The reward value is indicative of a qualitative and/or quantitative metric associated with the predicted resulting network data of the given action. As an example, larger reward values may correspond to improved qualitative/quantitative metrics associated with the wireless access points 10 (e.g., the given action increases the signal power and throughput rate of the wireless access points 10), and smaller reward values may correspond to worsened qualitative/quantitative metrics associated with the wireless access points 10 (e.g., the given action decreases the signal power and/or throughput rate of the wireless access points 10).

In one form, the reward value is further based on a location control weight associated with each action from among the set of actions 50. As used herein, the location control weights are scaling values assigned to the set of actions 50 based on one or more production constraints, time constraints, and location constraints. As an example, larger location control weights may be assigned to the actions that correspond to adjusting operational characteristics of wireless access points 10 in higher priority locations due to, for example, the type of products being manufactured at the corresponding location within the manufacturing environment 1 and/or the likelihood of network congestion at the given location. Example routines to predict the likelihood of network congestion are disclosed in U.S. patent application Ser. No. 17/122,413, which is commonly owned with the present application and the contents of which are incorporated herein by reference in its entirety.

In one form, the target action module 28 selects a target action from among the set of actions 50 based on each of the rewards. As an example, the target action module 28 selects the target action as the action 50 having the highest reward value.

In one form, the WAP control module 30 selectively adjusts (or instructs the wireless access points 10 to adjust) the one or more operational characteristics of the wireless access points 10 based on the target action. In one form, the WAP control module 30 adjusts the one or more operational characteristics by performing a load balancing routine, increasing/decreasing the signal powers of the corresponding wireless access points, activating/deactivating a set of the wireless access points 10, and/or adjusting the transmission channels of at least a set of the wireless access points.

As an example, when the target action is a self-organizing action, the WAP control module 30 performs one of a self-configuration routine (e.g., decreasing the signal powers of the wireless access points 10 to accommodate the inclusion of a new wireless access point) and a self-healing routine (e.g., increasing the signal powers of the wireless access points 10 to accommodate the removal of a wireless access point due to, for example, a power outage at the given wireless access point). As another example, when the target action is an RF adjustment action, the WAP control module 30 adjusts one or more RF characteristics (e.g., the signal power and/or transmission frequency/channel) to achieve a target throughput rate.

As a specific example and as shown in FIG. 5, the WAP control module 30 performs a self-configuration routine to accommodate the inclusion of the wireless access point 10-5. Furthermore, the WAP control module 30 may iteratively perform one or more RF adjustment actions such that the signal power of wireless access point 10-5 (denoted by circle 40-5) is equal to the signal powers of the wireless access points 10-1, 10-2, 10-3, 10-4 (denoted by the circles 40-1, 40-2, 40-3, 40-4) and such that a target throughput rate of the wireless access points 10-1, 10-2, 10-3, 10-4, 10-5 is satisfied.

As another specific example and as shown in FIG. 6, the WAP control module 30 performs a self-healing routine to accommodate the removal of wireless access point 10-10 having a signal power denoted by circle 40-10 from manufacturing environment 1-2 due to, for example, a local power outage. That is, the WAP control module 30 performs a self-healing routine on wireless access points 10-6, 10-7, 10-8, 10-9 to increase the signal power (denoted by circles 40-6, 40-7, 40-8, 40-9, respectively) and thereby accommodate the removal of the wireless access point 10-10. Furthermore, the WAP control module 30 may iteratively perform one or more RF adjustment actions to adjust the signal powers of the wireless access points 10-6, 10-7, 10-8, 10-9 such that a target throughput rate is satisfied.

Referring to FIG. 7, a flowchart illustrating a routine 700 for controlling one or more operational characteristics of the wireless access points 10 is shown. At 704, the central controller 20 generates state vectors based on the network data associated with the wireless access points (WAPs) 10. At 708, the central controller 20 identifies a set of actions associated with the state vectors. At 712, the central controller 20 determines a reward for each action and selects a target action from among the set of actions based on the rewards at 716. At 720, the central controller 20 selectively adjusts the one or more operational characteristics of the wireless access points 10 based on the target action.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling one or more operational characteristics of a plurality of wireless access points of a manufacturing environment, the method comprising:

generating a plurality of state vectors based on network data associated with the plurality of wireless access points;

identifying a set of actions from among a plurality of actions and associated with the plurality of state vectors;

determining a reward value for each action from among the set of actions based on a location control weight associated with each action from among the set of actions, wherein the location control weight is indicative of production constraints, time constraints, location constraints, or a combination thereof;

selecting a target action from among the set of actions based on the reward value corresponding to a highest reward value compared to the reward value associated with each unselected action from among the set of actions; and selectively adjusting the one or more operational characteristics of the plurality of wireless access points based on the target action.

2. The method of claim 1, wherein the set of actions are identified based on a Markov decision process (MDP) model associated with the plurality of wireless access points.

3. The method of claim 1, wherein the plurality of actions includes a self-organizing action, a radio frequency (RF) adjustment action, and a state-remain action.

4. The method of claim 1, wherein when the target action corresponds to a self-organizing action, selectively adjusting the one or more operational characteristics of the plurality of wireless access points further comprises:

adjusting one or more operational characteristics of the plurality of wireless access points to accommodate an inclusion of an additional wireless access point; or adjusting one or more operational characteristics of the plurality of wireless access points to accommodate a removal of a wireless access point from among the plurality of wireless access points.

5. The method of claim 4, wherein selectively adjusting the one or more operational characteristics of the plurality of wireless access points further comprises performing a load balancing routine.

6. The method of claim 1, wherein when the target action corresponds to a radio frequency (RF) adjustment action, selectively adjusting the one or more operational characteristics of the plurality of wireless access points further comprises:

adjusting one or more operational characteristics of the wireless access points to satisfy one or more network data constraints, wherein the one or more network data constraints includes a signal power constraint, a throughput rate constraint, or a load balancing restraint.

7. The method of claim 1, wherein the reward value is indicative of a qualitative metric associated with the network data, a quantitative metric associated with the network data, or a combination thereof.

8. The method of claim 1, wherein the reward value is further based on a location control weight associated with each action from among the set of actions.

9. The method of claim 1, wherein:

each state vector from among the plurality of state vectors corresponds to a given wireless access point from among the plurality of wireless access points and a given set of network data from among the network data;

each state vector from among the plurality of state vectors defines a location of the given wireless access point; and each state vector from among the plurality of state vectors defines a discrete time value associated with the given set of network data.

10. The method of claim 1, wherein the network data is indicative of a signal power of the plurality of wireless access points, a transmission frequency of the plurality of wireless access points, a throughput rate of the plurality of wireless access points, or a combination thereof.

11. A system for controlling one or more operational characteristics of a plurality of wireless access points of a manufacturing environment, the system comprising:

one or more processors and one or more non-transitory computer-readable mediums storing instructions that are executable by the one or more processors, wherein the instructions comprise:

generating a plurality of state vectors based on network data associated with the plurality of wireless access points, wherein the network data is indicative of a signal power of the plurality of wireless access points, a transmission frequency of the plurality of wireless access points, a throughput rate of the plurality of wireless access points, or a combination thereof;

identifying a set of actions from among a plurality of actions and associated with the plurality of state vectors based on a Markov decision process (MDP) model associated with the plurality of wireless access points, wherein the plurality of actions include a self-organizing action, a radio frequency (RF) adjustment action, and a state-remain action;

determining a reward value for each action from among the set of actions based on a location control weight associated with each action from among the set of actions, wherein the location control weight is indicative of production constraints, time constraints, location constraints, or a combination thereof, and wherein the reward value is indicative of a qualitative metric associated with the network data, a quantitative metric associated with the network data, or a combination thereof;

selecting a target action from among the set of actions based on the reward value corresponding to a highest reward value compared to the reward value associated with each unselected action from among the set of actions; and selectively adjusting the one or more operational characteristics of the plurality of wireless access points based on the target action.

12. The system of claim 11, wherein when the target action corresponds to a self-organizing action, selectively adjusting the one or more operational characteristics of the plurality of wireless access points further comprises:

adjusting one or more operational characteristics of the plurality of wireless access points to accommodate an inclusion of an additional wireless access point; or adjusting one or more operational characteristics of the plurality of wireless access points to accommodate a removal of a wireless access point from among the plurality of wireless access points.

13. The system of claim 12, wherein selectively adjusting the one or more operational characteristics of the plurality of wireless access points further comprises performing a load balancing routine.

14. The system of claim 11, wherein when the target action corresponds to a radio frequency (RF) adjustment action, selectively adjusting the one or more operational characteristics of the plurality of wireless access points further comprises:

adjusting one or more operational characteristics of the wireless access points to satisfy one or more network data constraints, wherein the one or more network data constraints includes a signal power constraint, a throughput rate constraint, or a load balancing restraint.

15. The system of claim 11, wherein the reward value is further based on a location control weight associated with each action from among the set of actions.

16. The system of claim 11, wherein:
- each state vector from among the plurality of state vectors corresponds to a given wireless access point from among the plurality of wireless access points and a given set of network data from among the network data;
- each state vector from among the plurality of state vectors defines a location of the given wireless access point; and
- each state vector from among the plurality of state vectors defines a discrete time value associated with the given set of network data.

17. A method for controlling one or more operational characteristics of a plurality of wireless access points of a manufacturing environment, the method comprising:
- generating a plurality of state vectors based on network data associated with the plurality of wireless access points, wherein the network data is indicative of a signal power of the plurality of wireless access points, a transmission frequency of the plurality of wireless access points, a throughput rate of the plurality of wireless access points, or a combination thereof;
- identifying a set of actions from among a plurality of actions and associated with the plurality of state vectors based on a Markov decision process (MDP) model associated with the plurality of wireless access points, wherein the plurality of actions include a self-organizing action, a radio frequency (RF) adjustment action, and a state-remain action;
- determining a reward value for each action from among the set of actions and a location control weight associated with each action from among the set of actions, wherein the location control weight is indicative of production constraints, time constraints, location constraints, or a combination thereof;
- selecting a target action from among the set of actions based on the reward value corresponding to a highest reward value compared to the reward value associated with each unselected action from among the set of actions; and
- selectively adjusting the one or more operational characteristics of the plurality of wireless access points based on the target action.

18. The method of claim 17, wherein when the target action corresponds to a self-organizing action, selectively adjusting the one or more operational characteristics of the plurality of wireless access points further comprises:
- adjusting one or more operational characteristics of the plurality of wireless access points to accommodate an inclusion of an additional wireless access point; or
- adjusting one or more operational characteristics of the plurality of wireless access points to accommodate a removal of a wireless access point from among the plurality of wireless access points.

19. The method of claim 18, wherein selectively adjusting the one or more operational characteristics of the plurality of wireless access points further comprises performing a load balancing routine.

20. The method of claim 17, wherein when the target action corresponds to a radio frequency (RF) adjustment action, selectively adjusting the one or more operational characteristics of the plurality of wireless access points further comprises: adjusting one or more operational characteristics of the wireless access points to satisfy one or more network data constraints, wherein the one or more network data constraints includes a signal power constraint, a throughput rate constraint, or a load balancing restraint.

* * * * *